United States Patent [19]

Da Silva

[11] 3,790,699

[45] Feb. 5, 1974

[54] SIMPLEX RADIOTELEGRAPH SYSTEM

[75] Inventor: Herman Da Silva, Voorburg, Netherlands

[73] Assignee: De Staat der Nederlanden te DeZenvertegenwoordigd door de Directeur-Generaal der Posterijen, Telegrafie en Telefonie, The Hague, Netherlands

[22] Filed: Apr. 26, 1972

[21] Appl. No.: 247,753

[30] Foreign Application Priority Data

Apr. 28, 1971 Netherlands ...................... 7105791

[52] U.S. Cl. ................. 178/2 A, 178/69 R, 325/21, 325/41, 340/146.1 C

[51] Int. Cl. ......................... H04l 15/22, H04l 15/26

[58] Field of Search ................... 325/21, 22, 37, 41; 340/146.1 BA, 146.1 C; 178/69 R, 69 G, 69 L, 2 A

[56] References Cited

UNITED STATES PATENTS

| | | | |
|---|---|---|---|
| 3,321,573 | 5/1967 | Da Silva | 178/2 A |
| 3,420,948 | 1/1969 | Arko | 325/22 X |
| 3,571,512 | 3/1971 | Quiros | 325/22 X |

*Primary Examiner*—Malcolm A. Morrison
*Assistant Examiner*—R. Stephen Dildine, Jr.
*Attorney, Agent, or Firm*—Hugh Adam Kirk

[57] ABSTRACT

A simplex radio telegraph system with automatic error correction, wherein message signals transmitted to a receiving station are included in time spaced frames. The time space between consecutive ones of said frames being employed by the receiving station to return one of two service signals to indicate to the sending station whether transmission can be continued or a message signal due to an error has to be repeated. Each station is provided with circuitry for sending and detecting, respectively, a third service signal, and additional circuitry for sending and detecting, respectively, a service frame for calling-in said third service signal so as to bring a sending station into its received state, and vice versa. In order to cease established communication(s) to give priority to one or more stations involved in an emergency situation, an auxiliary circuit arrangement is provided by which a station when in its receiving state is able to transmit a fourth service signal. A station when in its sending state can be caused to respond to a fourth service signal through an OR-gate to bring its time distributers into a stand-by state. Alternatively a station when in its receiving state can be caused to respond to a specific service frame through the fore-said OR-gate to bring its time distributors into a stand-by state.

9 Claims, 1 Drawing Figure

TRANSMITTING STATION

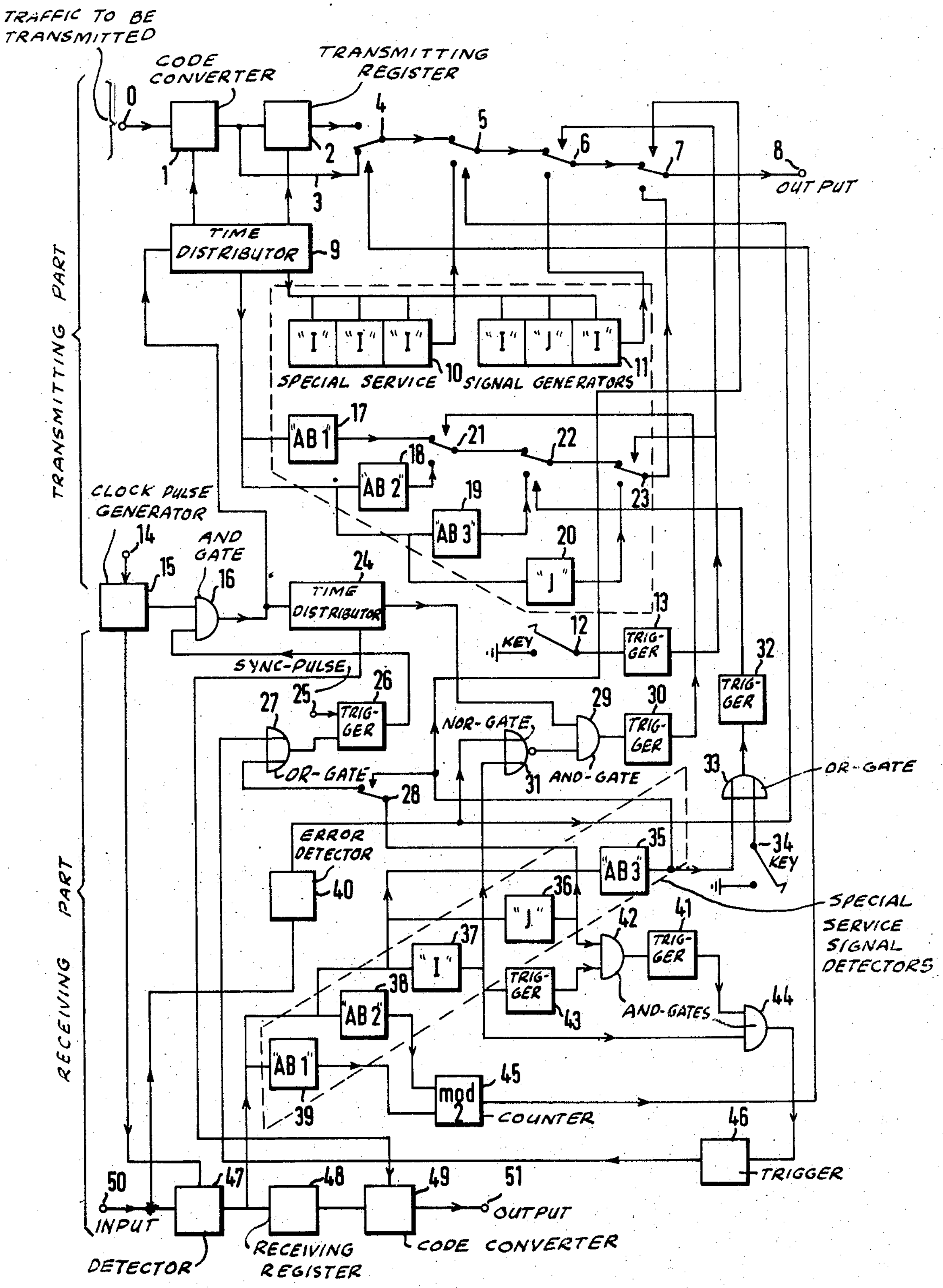
TRANSMITTING STATION

SIMPLEX RADIOTELEGRAPH SYSTEM

BACKGROUND OF THE INVENTION

The invention relates to a simplex radiotelegraph system with automatic error correction by repetition (ARQ). The traffic signals are controlled by time distributors and are transmitted in spaced blocks in one direction and during the spaces, pauses, or intervals between these blocks the traffic receiving station reports the correct or incorrect reception in the other direction by the transmission of one of two service signals given for that purpose. These service signals are used alternately in case of an uninterrupted process of the traffic and always initiate the transmission of a next block by the traffic-transmitting station. This transmitting station is also provided with means for the transmission and detection of a third service signal, respectively, and for the transmission and detection of a service block for calling the third service signal, in order to put a transmitting station in the receiving state, and conversely. In this system one station of the connection is the master station and the other one the slave station, which state is maintained for the duration of the connection irrespective of the direction of traffic. Thus the master station transmits signals, either traffic signals or calling or restarting signals under all circumstances, except when being in the stand-by position.

Such a system is known from the United States patent specification No. 3.321.573, and describes the way in which the third service signal or the third service block, respectively, can be applied for reversing the direction of traffic without loss of information.

A specific problem in simplex radio traffic with ships and between ships, is to stop the traffic connection unexpectedly as a matter of course when official instructions for emergency traffic have to be carried out, and this invention provides a solution to this problem.

SUMMARY OF THE INVENTION

According to this invention, the solution is obtained by means for transmitting, by the traffic-receiving station, an emergency indicating fourth service signal ("J"), and having an OR-gate, trigger and AND-gate in the traffic-transmitting station to put its time distributors in the stand-by position This OR-gate also is controlled by the reception of a service block ("I–J–I") by the traffic-receiving station as another result of which a trigger controls said OR-gate, or by the reception of the fourth service signal ("J") by the traffic-transmitting station as a result of which said OR-gate is controlled via a switch.

BRIEF DESCRIPTION OF THE VIEW

The invention wil be elucidated hereafter by the description of a transmitting-receiving station with reference to the single FIGURE drawing which shows a schematic block wiring diagram of a station in the state in which the incoming information is transmitted.

DETAILED DESCRIPTION OF PREFERRED EMBODIMENT

The connecting point 0 for the incoming information to be transmitted is connected to a code converter 1, which, under the control of a time distributor 9, passes the flow of information to a transmitting register 2 and to an output 8 via a conductor 3 and the switches 4, 5, 6 and 7. The transmitting register 2 is also controlled by the time distributor 9.

The switch 4, controlled by a modulo-2 counter 45, can connect the transmitting register 2 to the output 8. Controlled by an error detector 40, the switch 5 can connect a generator 10 for an ARQ service block "I—I—I" to the output 8. The switch 6, controlled by a trigger 13, can connect a generator 11 for an emergency indicating service block "I-J-I" to the output 8. Finally the switch 7, controlled by a detector 35 for the signal "AB3," can connect the output of a switch 23 to the output 8. For synchronization the generators 10 and 11 are connected to an output of the time distributor 9.

The generators 17, 18, 19 and 20, generating the service signals "AB1," "AB2," "AB3" and "J," respectively, are also controlled by the time distributor 9. The alternately transmitted ARQ or special answer back correct reception indicating signals "AB1" and "AB2," respectively, can be passed to the inputs of a switch 21, leading to an input of the switch 23 via a switch 22 and controlled by a trigger 30. Controlled by a trigger 32, the switch 22 can lead the third special answer back traffic direction change indicating signal "AB3" to the same input of the switch 23. The other input of the switch 23 is connected to the output of the generator 20. The switch 23 is controlled by the trigger 13, delivering a pilot, fourth special, or emergency indicating signal "J" when pressing a key 12 in order to ground an input of the trigger.

The time distributor 9 and a time distributor 24 are controlled by a clock pulse generator 15, capable of deriving data from an input 14 in order to synchronize the station with other transmitting and receiving stations. Controlled by a trigger 26 the time distributors 9 and 24 are connected to the clock pulse generator by an AND-gate 16. At the receiving end of the station the time distributor 24 controls an AND-gate 29 and a code converter 49. This code converter 49 is the last link in the chain for passing on the information received at an input 50, which information is then detected in a detector 47, which is controlled by the clock pulse generator 15, stored by a receiving register 48 and led to the output 51 by the code converter 49. Moreover the output of the detector 47 is connected to the inputs of five specific detection circuits 35, 36, 37, 38 and 39 for the special service signals "AB3," "J," "I," "AB2" and "AB1," respectively. The signals "AB1" and "AB2" are counted modulo-2 by the counter 45. The signal "AB3" controls the switches 28 and 7 and, via an OR-gate 33, the trigger 32. A second input of the OR-gate 33 can be manipulated by a key 34. The error detector 40 is connected direct to the input 50.

A detector for a an emergency indicating signal block "I–J–I" is formed by a trigger 43, connected to an output of the I-detector 37, an AND-gate 44, connected to the same output, an AND-gate 42, connected to an output of the J-detector 36 and to an output of the trigger 43, and by a trigger 41, connected to an output of this AND-gate 42, the latter trigger 42 also controlling the AND-gate 44, which AND-gate 44 controls a trigger 46. Via the switch 28 the output of the J-detector 36 can be connected to an OR-gate 27, also connected to an output of the trigger 46 and leading to an input of the trigger 26. For resetting under the control of a synchronization pulse, the trigger 26 is provided with an input 25. The output of the I-detector 37 also leads to a NOR-gate 31, capable of being controlled by the error detector 40. The NOR-gate 31 leads to an input of the AND-gate 29, leading to the trigger 30.

The working of the transmitting and receiving station is different depending whether the station transmits or receives information in simplex operation. In the FIGURE it is assumed that the information is transmitted and correctly received in another co-operating station. As shown in the FIGURE the flow of information takes place from the input 0 to the output 8. At the input 50 the service signals "AB1" and "AB2" are received from the co-operating station in an unbroken sequence. An interruption in this sequence causes the modulo-2 counter 45 to reverse the switch 4, as a result of which the information already transmitted is now transmitted from the register 2. On receipt of a signal "AB3," the detector 35 reverses the switch 7, as a result of which the station assumes the information-receiving state. On receipt of the emergency indicating special service signal "J", the AND-gate 16 is blocked via the OR-gate 27 and the trigger 26, so that the time distributors 9 and 24 get into a stand-by position, which is discontinued as soon as a synchronization pulse resets the trigger 26 via the input terminal 25. The transmission of the emergency indicating service block "I–J–I" by manipulating the key 12, as a result of which the switch 6 is reversed, initiates a stand-by position in the co-operating station which is in the information-receiving state. The transmission of ARQ service block "I—I—I" is effected from the error detector 40 by reversing the switch 5.

The information-receiving state of the station is characterized by the position of the switch 7, in which state the output of the switch 23 is connected to the output 8. In this state the transmission of the emergency indicating special service signal "J" can be effected by manipulating the key 12, as a result of which the switch 23 is reversed. As has been explained above, the reception of the latter signal "J" initiates the stand-by position of the co-operating station, which is in the information-transmitting state. If on the other hand the co-operating station transmits a service block "I-J-I," this is indicated by the position of the trigger 46, which position in such a case puts the trigger 26 in the blocking position of the AND-gate 16 via the OR-gate 27. Then the station is again in the stand-by position, which is discontinued by the reception of a synchronization pulse at the input 25.

The letter "J" is chosen for the fourth service signal "J" or the second service block "I–J–I," respectively, because the Hamming-distance between this letter "J" and the letter "I" is as long as possible when using the usual coding. In this way the distinction between the "I" and the "I—I—I," respectively, used in the ARQ system is optimum.

While there is described above the principles of this invention in connection with specific apparatus, it is to be clearly understood that this description is made only by way of example and not as a limitation to the scope of this invention.

I claim:

1. An automatic error correcting simplex telecommunication system for interrupting traffic information between two stations in which each station has:

A. means for transmitting blocks of traffic information signals spaced by pauses between each block, B. means for transmitting two different answer-back service signals during said pauses for indicating correct and incorrect reception of the block just received from a remote station, and C. means for transmitting during one of said pauses, a third service signal different from said two answer-back service signals for indicating to said remote station that the direction of traffic information is to be changed;

the improvement comprising:

D. means for transmitting a fourth service signal different from said other three service signals for placing any remote station in a stand-by position.

2. A system according to claim 1 wherein one station is a master station and the other station is a slave station which condition is maintained irrespective of the direction of traffic except when placed in said stand-by position.

3. A system according to claim 1 wherein said fourth service signal comprises a special block signal transmitted from a transmitting station, and a fourth service signal transmitted during said pauses when transmitted from a receiving station.

4. A system according to claim 3 wherein each of said stations has time distributors, and wherein said fourth service signal places said distributors in their stand-by positions.

5. A system according to claim 4 wherein each of said stations includes an OR-gate for controlling said distributors responsive to either of said fourth special service signals.

6. In an automatic error correcting simplex telecommunication system in which spaced blocks of information signals are transmitted in one direction between two stations, and two different answer back signals are transmitted from the station receiving said blocks between each block to indicate to the block transmitting station that the just received block was either correctly received and the next block should be transmitted or that the just received block was incorrectly received and must be repeated, means for generating a third answer back signal at the block receiving station and transmitting it between said blocks for changing said block transmitting station to a block receiving station, the improvement comprising: means for interrupting the transmission between said stations comprising means at each station for transmitting a fourth service signal for placing the remote station in stand-by position for emergency operation.

7. A system according to claim 6 wherein said means for transmitting said fourth service signal comprises means for transmitting a special block signal from said transmitting station, and means for transmitting a special fourth service signal in the spaces between said blocks from said receiving station.

8. A system according to claim 7 wherein each said station comprises time distributors, and means responsive to said fourth service signals for placing said time distributing means in stand-by operation.

9. A system according to claim 8 including an OR-gate responsive to either of said fourth service signals for controlling said time distributing means.

* * * * *

PO-1050
(5/69)

UNITED STATES PATENT OFFICE
CERTIFICATE OF CORRECTION

Patent No. 3,790,699 Dated February 5, 1974

Inventor(s) Herman da SILVA

It is certified that error appears in the above-identified patent and that said Letters Patent are hereby corrected as shown below:

Sheet 1, Abstract, line 13 change "received" to - - receiving - -

Signed and sealed this 7th day of January 1975.

(SEAL)
Attest:

McCOY M. GIBSON JR.
Attesting Officer

C. MARSHALL DANN
Commissioner of Patents